May 15, 1928.
G. A. HOLMES
1,669,415
FASTENER
Filed April 22, 1927
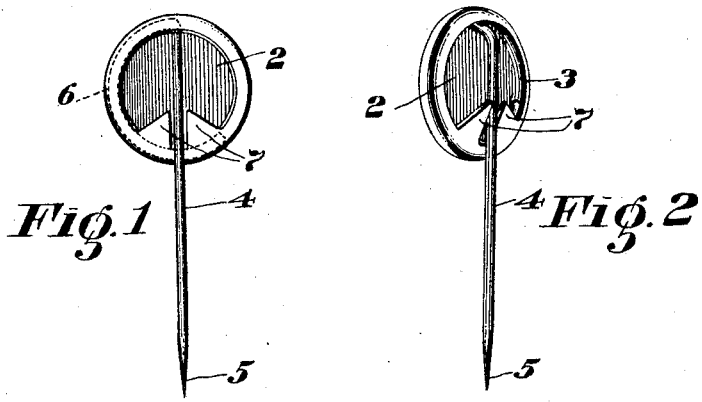
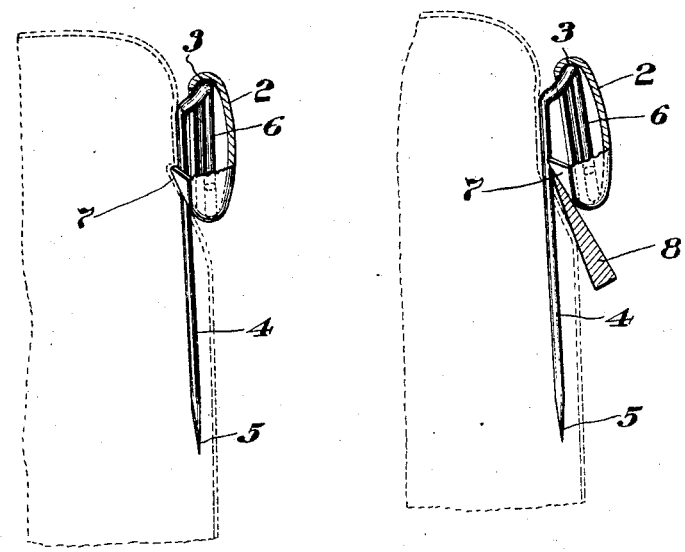
INVENTOR:
George A. Holmes.
BY
ATTORNEY Patented May 15, 1928.

1,669,415

UNITED STATES PATENT OFFICE.

GEORGE A. HOLMES, OF NEWTON, MASSACHUSETTS, ASSIGNOR TO UNITED STATES FASTENER COMPANY, OF SOUTH BOSTON, MASSACHUSETTS, A CORPORATION OF MASSACHUSETTS.

FASTENER.

Application filed April 22, 1927. Serial No. 185,808.

This invention relates to pin fasteners and will be herein disclosed as embodied in a fastening device designed especially for use in securing slip covers to the upholstery of automobiles, although it will be evident that the device also is useful for many other purposes.

It is the chief object of the invention to devise a pin fastener of the general character above mentioned which can be easily inserted, cannot back out accidentally, and which can be manufactured economically.

The nature of the invention will be readily understood from the following description when read in connection with the accompanying drawings, and the novel features will be particularly pointed out in the appended claims.

In the drawings,

Figure 1 is a rear elevation of a pin fastener embodying this invention;

Fig. 2 is a perspective view of the fastener shown in Fig. 1;

Fig. 3 is a view, partly in side elevation and partly in cross-section, illustrating one method of using the fastener shown in Figs. 1 and 2; and Fig. 4 is a view similar to Fig. 3 showing the manner in which the fastener may be removed.

The fastener shown comprises a hollow head or cap 2, preferably made of some resilient sheet metal, such as sheet steel or brass. This head usually is given a more or less flattened or button-shaped form and has a smooth front face and a hollow back. It is also provided with a hollow flanged rim portion 3.

The fastener also includes a pin which consists of a shaft 4 provided at one end with a point 5 and at its opposite end with a curved spring portion 6. This spring portion is snapped into the hollow rim 3 of the head and anchors or secures the pin operatively to the head. Fasteners of the construction so far described have been on the market for many years.

According to the present invention two spurs 7—7, preferably formed integral with the head 2 at the rim portion thereof, are arranged to project inwardly from the rim to points under the head. The shaft 4 of the pin lies between these spurs, as clearly shown in the drawings. It will be observed that the points of the spurs are directed backwardly, or point in a direction approximately opposite to that of the point 5 of the pin. Consequently, when this fastener is inserted in the upholstery of a chair, seat or the like, as shown in Fig. 3, the spurs slide freely over the fabric and offer no substantial resistance to this inserting movement. If, however, any attempt is made to withdraw the fastener, the spurs immediately enter the fabric and effectually resist such withdrawal or backward movement.

The fastener can, however, be easily removed by slipping a dull edged blade 8 under the head of the fastener and in engagement with the outer surfaces of the spurs 7—7, thus pressing these spurs outwardly and releasing them from the fabric, after which a further movement of the blade will carry the fastener backwardly and remove it. This releasing movement of the spurs is permitted partly by the fact that the spurs themselves are resilient, and also because of the nature of the connection between the pin and the head 2 which permits considerable relative movement of the shaft of the pin toward or from the edge of the head.

The fastener is particularly useful in securing slip covers to the seats and upholstery of automobiles and for analogous purposes. It is very convenient to use, is reliable and is relatively inexpensive.

In manufacturing the fastener the heads are made by the punch and die process, the pins are manufactured in the well known manner, the spring portions 6 being made by suitable bending operations. Subsequently the head and spring of each individual fastener are assembled simply by snapping the curved spring section under the flanged rim 7 of the head.

While I have herein shown and described a preferred embodiment of my invention, it will be understood that the invention may be embodied in somewhat different forms without departing from the spirit or scope thereof.

Having thus described my invention, what I desire to claim as new is:

1. A fastener of the character described, comprising a head having a back and front, a pin fastened to said head and having a shaft portion extending past and close to the edge of said head at the back thereof but free to move toward or from said edge, and two spurs carried by said head and located at opposite sides of the shaft of said pin, said spurs pointing away from the point of the pin.

2. A fastener of the character described, comprising a hollow sheet metal head having a back and front, a pin fastened to said head and including a shaft extending past and close to the edge of said head at the back thereof but free to move toward or from said edge, and two spurs integral with said head and located at opposite sides of and close to the shaft portion of said pin, whereby they limit lateral movement of the pin, said spurs pointing backwardly away from the edge of the head.

3. A fastener of the character described, comprising a hollow sheet metal head having a front and back and provided with a curved hollow rim portion, a pin having a part anchored in said hollow rim, said pin including a shaft extending from a point adjacent to one edge of said head, across said back, and past and close to said rim at the opposite edge of the head, and two spurs integral with said head at the rim thereof, said spurs pointing backwardly away from said rim, and said shaft extending between and close to said spurs whereby said spurs serve to prevent any substantial lateral movement of the pin.

GEORGE A. HOLMES.